Oct. 18, 1932.  A. W. ANDERSON  1,882,707

DRIVEN PLATE

Filed Oct. 8, 1930

Witness:
William P. Kilroy

Inventor:
Arthur W. Anderson
By Wm. O. Bell

Patented Oct. 18, 1932

1,882,707

UNITED STATES PATENT OFFICE

ARTHUR W. ANDERSON, OF CHICAGO, ILLINOIS, ASSIGNOR TO THE BORG & BECK COMPANY, OF CHICAGO, ILLINOIS, A CORPORATION OF ILLINOIS

DRIVEN PLATE

Application filed October 8, 1930. Serial No. 487,128.

This invention relates to friction clutches and more especially to the clutch or driven plate which is interposed between two parts of a driving member and is adapted to be gripped or clamped by said parts under sufficient pressure to impart motion from the driving member to a driven shaft on which the clutch plate is mounted. The invention is particularly useful in friction clutches for automobiles in which it is desired that the clutch should take hold progressively to full engagement and thereby avoid grabbing and jerking.

The object of the invention is to increase the yielding action of the clutch plate at the beginning of the compression movement, and thereby enable the clutch to take hold more gradually than has been customary heretofore and without losing the smoothness of action incident to progressive application of torque.

A further object of the invention is to provide a clutch plate adapted for progressive engagement and disengagement with means whereby its progressive movement will be accelerated particularly at the beginning of its engaging movement and at the ending of its disengaging movement.

And a further object is to avoid the effect of localized high pressure areas in the clutch by providing for an even distribution of the yielding effect of the driven plate over the entire surface of the friction facings.

The invention is primarily adapted for a clutch plate having peripherally disposed yielding sectors interposed between continuous friction rings, one type of which is illustrated in Letters Patent No. 1,659,289, granted to D. E. Gamble, assignor, on February 14, 1928, and I have selected this type of plate for illustrating the invention in the accompanying drawing in which Fig. 1 is a side elevation of the clutch plate showing one of the friction rings partly broken away.

Figure 1:
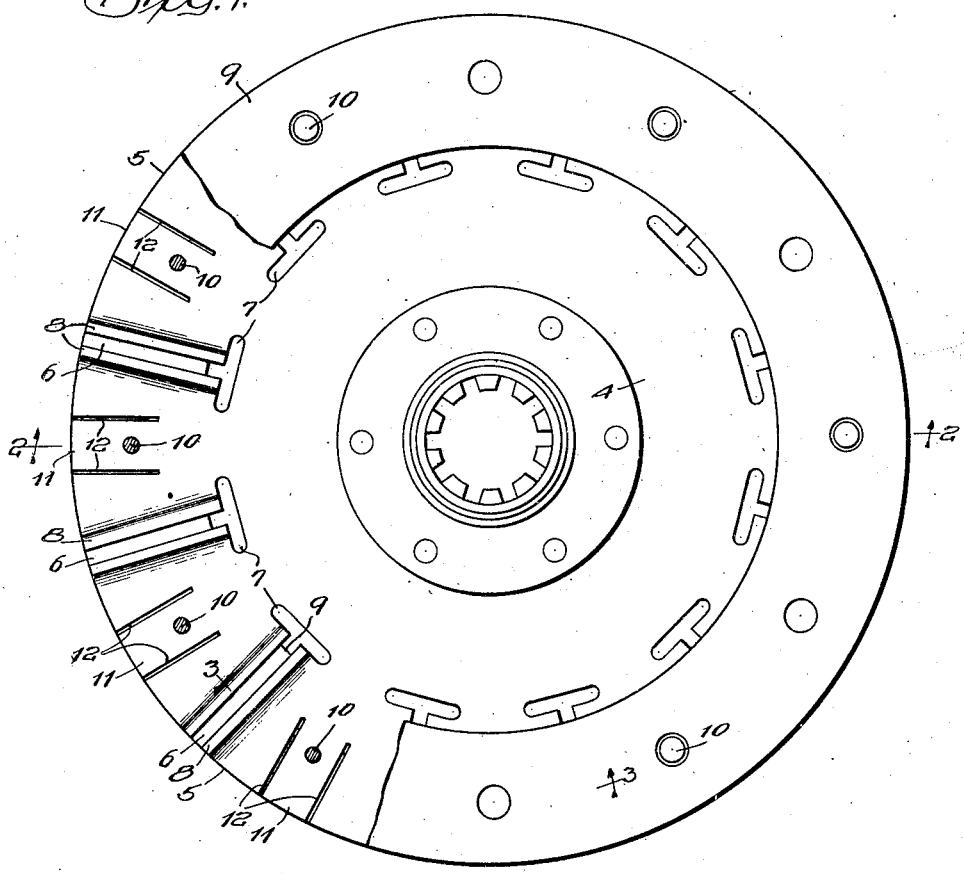
Figure 2:
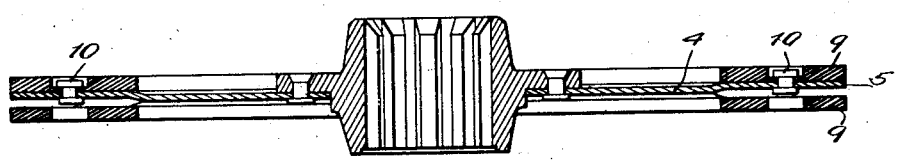
Fig. 2 is a transverse sectional view on the line 2—2 of Fig. 1.
Figure 3:
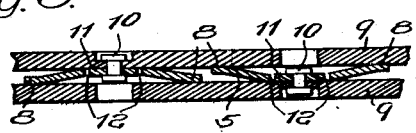
Fig. 3 is a sectional view on the line 3—3 of Fig. 1.

Referring to the drawing the clutch plate 4 is divided into a plurality of sectors 5 by radial slots 6 which extend through the periphery of the plate and connect at their inner ends with transverse slots 7 at or about the middle thereof to form T-shaped slots separating the sectors. Alternate sectors are bent bodily and laterally of the plate to offset positions on opposite sides of the plate and the marginal edge portions 8 of each sector extending along the slots 6 are bent to lie normally in or about the plane of the intermediate portion of adjacent sectors. Continuous friction rings 9 are arranged on opposite sides of the plate and are fastened by rivets 10, or other suitable fastening means, to the alternate sectors with which they engage. Thus one ring is fastened to alternate sectors on one side of the plate and the other ring is fastened to the other sectors on the other side of the plate. The offset sectors support the rings so that they will make full contact with the driving parts throughout the engaging and disengaging movements of the clutch, and they also make these movements progressive to full engagement and to disengagement. The object of my invention is to improve the action of the clutch by accelerating the initial part of the engaging movement and the finishing part of the disengaging movement and at the same time provide the smoothness of action which is desirable in clutches for automobiles. With this end in view I provide each of the sectors with a substantially flat tongue 11 to receive the rivet 10 by which the ring is fastened thereto. This tongue is conveniently made by cutting the plate to form slots 12, 12 which are located adjacent to but are spaced apart on opposite sides of the rivet 10, and the slots are preferably parallel but they may be made radial of the plate or in any other position suitable for the purpose. The slots are preferably narrow and extend through the periphery of the plate and inward beyond the rivet. To obtain a more flexible plate the slots may be widened and lengthened as desired. The slots 12 provide a relief for the stresses and strains of the metal of the sectors in the engaging and disengaging movements of the clutch and the tongues contribute to the yielding and cushioning effect. The slots make the sectors more flexible and mount the rings more yieldingly than has been the practice in plates of this general type. This accelerates the yielding action of the sectors at the beginning of the engaging movement and at the ending of the engaging movement, makes the action of the clutch smoother, and provides an improved cushioning effect which is so highly desirable, especially for clutches used in automobiles.

I have shown the invention in one type of clutch plate for the purposes of this application but I reserve the right to employ it in other clutch plates and to make such changes as may be required to adapt it therefor or for other purposes within the scope of the following claims.

I claim:

1. A clutch plate having a plurality of pairs of slots extending through the periphery of the plate and forming substantially flat spaced tongues, said tongues being bent to alternately lie on opposite sides of the plate, continuous friction rings on opposite sides of the plate, and means fastening the friction rings to alternate tongues, the slots forming each tongue being located adjacent to and spaced apart on opposite sides of the fastening means.

2. A clutch plate having a plurality of pairs of slots extending through the periphery of the plate and forming substantially flat spaced tongues, said tongues being bent laterally and alternately on opposite sides of the plate, continuous friction rings on opposite sides of the plate, and means fastening the friction rings to alternate tongues, the slots forming each tongue being parallel and located adjacent to and on opposite sides of the fastening means.

3. A clutch plate having a plurality of peripheral spaced sectors laterally bent alternately on opposite sides of the plate, slots in said sectors extending through the periphery of the plate and forming spaced tongues, continuous friction rings on opposite sides of the plate, and means fastening the friction rings to alternate tongues, the slots forming each tongue being located adjacent to and spaced apart on opposite sides of the fastening means.

ARTHUR W. ANDERSON.